United States Patent
Just

(10) Patent No.: US 6,389,339 B1
(45) Date of Patent: May 14, 2002

(54) VEHICLE OPERATION MONITORING SYSTEM AND METHOD

(76) Inventor: William J. Just, 2465 Mountain Rd., Alpharetta, GA (US) 30004

( * ) Notice: Subject to any disclaimer, the term of this patent is extended or adjusted under 35 U.S.C. 154(b) by 0 days.

(21) Appl. No.: 09/448,746

(22) Filed: Nov. 24, 1999

(51) Int. Cl.$^7$ .............................................. G06F 17/00
(52) U.S. Cl. .............................. 701/33; 701/24; 701/28
(58) Field of Search .......................... 701/24, 25, 28, 701/29, 30, 32, 33, 35; 348/148, 149; 340/439, 992; 455/517

(56) References Cited

U.S. PATENT DOCUMENTS

| | | | |
|---|---|---|---|
| 5,319,394 A | 6/1994 | Dukek | 348/148 |
| 5,406,324 A | 4/1995 | Roth | 348/22 |
| 5,508,736 A | 4/1996 | Cooper | 384/144 |
| 5,726,660 A | 3/1998 | Purdy et al. | 342/357 |
| 5,742,336 A | 4/1998 | Lee | 348/144 |
| 5,806,005 A | 9/1998 | Hull | 455/566 |
| 5,841,971 A | 11/1998 | Longginou et al. | 395/200 |
| 5,949,818 A | * 9/1999 | Chiou | 375/211 |
| 6,161,154 A | * 12/2000 | Schultz et al. | 710/56 |

* cited by examiner

*Primary Examiner*—Gertrude Arthur
(74) *Attorney, Agent, or Firm*—Baker, Donelson, Bearman & Caldwell

(57) ABSTRACT

Operation of a vehicle is monitored with an on-board video camera linked with a radio transceiver. A monitoring service computer at a global network site relays video data received from the transceiver to a home base computer via the network. Parental monitoring of adolescent driving is a primary use of the monitoring method and system.

10 Claims, 2 Drawing Sheets

VEHICLE OPERATION MONITORING SYSTEM AND METHOD

TECHNICAL FIELD

This invention relates to systems and methods of monitoring the operation of automotive vehicles.

BACKGROUND OF THE INVENTION

Very often vehicles are operated by persons other than their owners. In those situations the owners normally have a vested interest in seeing that their vehicles are operated in a safe and prudent manner. For example, the backs of trucks are often marked, "How is my driving? Call (a certain telephone number)." Rental car companies also have an interest in seeing that their cars are not mishandled. Government agencies too sometimes need to maintain surveillance on the operation of their law enforcement vehicles.

Truck and van lines, rental car agencies and governmental agencies have substantial resources available in which to monitor vehicle operation. For example, they sometimes mark the roofs of vehicles with identification numbers that may be observed by helicopters. As shown in U.S. Pat. No. 5,742,336 airlines can utilize satellites in feeding video signals to ground stations so that ground personnel can monitor in-flight instruments. Law enforcement agencies also use geopositional transmitters and satellites.

As opposed to organizations with substantial resources, individuals have a far more limited means available to them for this purpose. Thus parents, for example, have had to rely on word of mouth reports as to how their adolescent children drive a family car. Though engine governors are available to limit speed, they are rarely used today. Thus a need has long existed for a way of monitoring the driving of adolescent children which is cost effective, both in terms of equipment and time efficiency, and yet which may be achieved with reasonable cost economy. Accordingly, it is to the provision of such that the present invention is primarily directed.

SUMMARY OF THE INVENTION

In a preferred form of the invention, operation of a vehicle is monitored with an on-board video camera having a video data line linked with a radio transceiver from a home base computer. Communication is established between the home base computer and a monitoring service computer on the internet. An initial signal is transmitted to the monitoring service which radio relays a transmit signal to the on-board transceiver. Video data is then transmitted from the on-board radio transceiver to the home base computer for viewing with a monitor. Later, a terminate signal is transmitted from the home base computer to the monitoring service which radio relays a terminate transmission signal to the on-board transceiver thereby disestablishing communication between the home base computer and the monitoring service computer.

In another preferred form of the invention a system for monitoring operations of a vehicle from a home base comprises a home based computer and monitor, a service monitor computer linked with the home based computer via the internet and linked with a radio wireless transceiver, and a video camera mounted in the vehicle. The video camera has a video data line connected with an on-board CPU, modem and wireless radio transceiver. So constructed a home based person may go on line with the service monitor web page and have the service monitor initiate transmission of video data from the vehicle to enable the home based person to view such via the internet.

DETAILED DESCRIPTION

Figure 1:
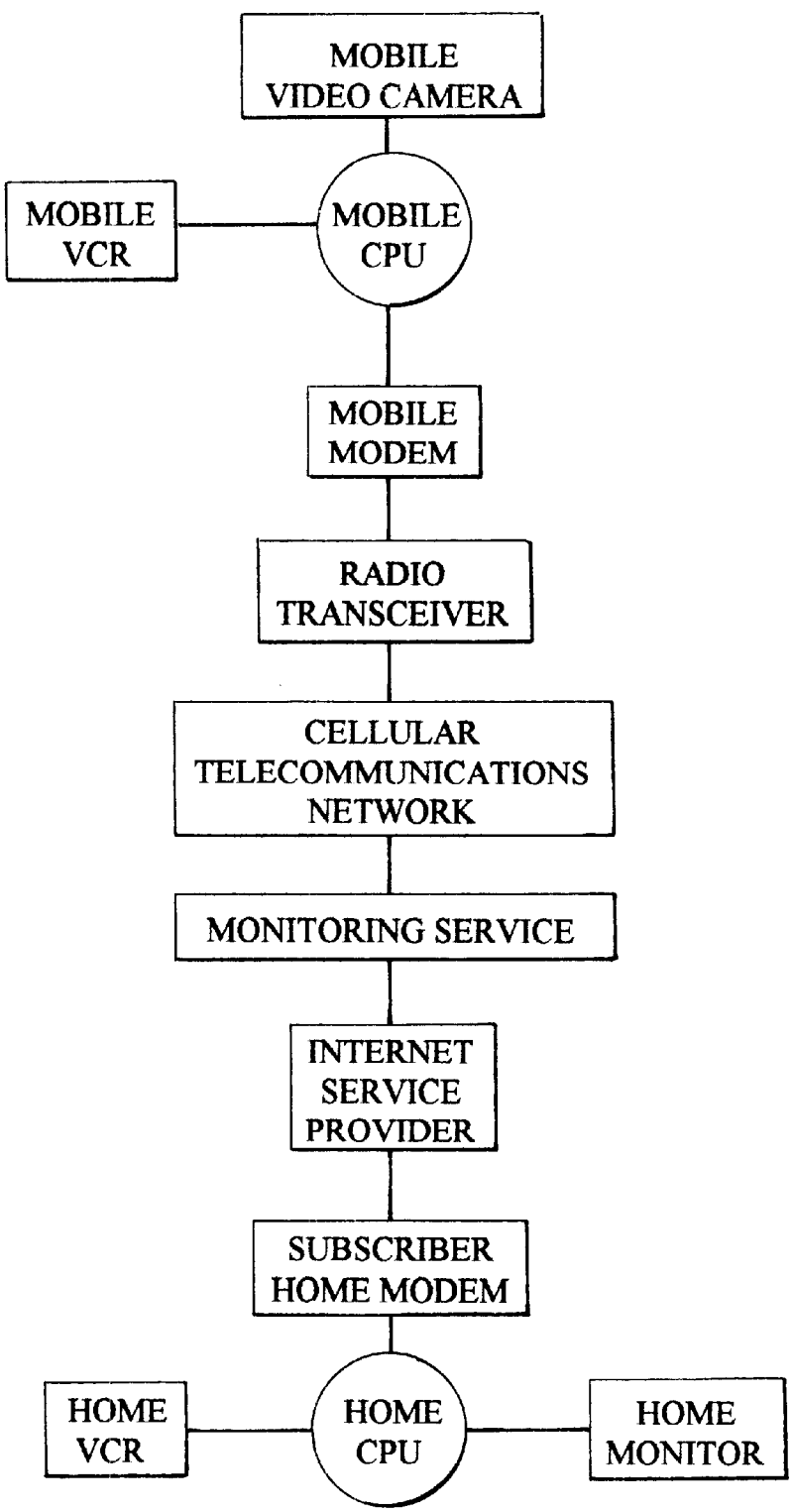
FIG. 1 is a block diagram of a preferred form of the monitoring system.
Figure 2:
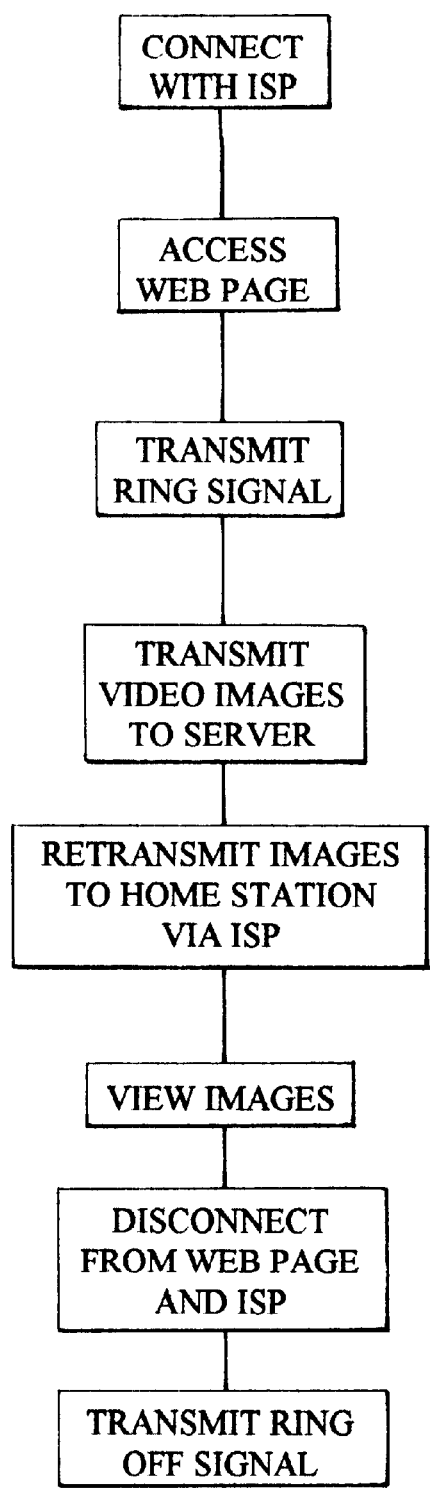
FIG. 2 is a flow diagram of a preferred form of the monitoring method.

With reference next to the drawings, there is shown a vehicle operation monitoring system having a mobile station in telecommunication with a subscriber or home viewing station through a cellular telephone wireless transceiver system and internet service provider. The mobile station is located in an transportation vehicle and includes a central processing unit (CPU) coupled with a video camera and a modem. The video camera is mounted within the vehicle to be monitored with its lens located at an angle and distance to have dashboard instrumentation, including the speedometer within its field of view. The modem is coupled to a cellular wireless phone transceiver. A video recorder is also coupled to the CPU to record video images in real time. The CPU is selected and programmed to translate and relay image data from the video camera to the modem and recorder upon an initiation signal being received via the cellular telephone. The CPU includes code necessary to perform processing functions on photographic images prior to their transmission, such as protocol packetizing and encryption. Such protocol functions preferably utilize conventional MODBUS translation protocol. The modem converts the image data into a signal suitable for transmission over the wireless cellular telephone system. Preferably the mobile CPU is a laptop computer. The video camera, video recorders, modems and cellular wireless communication telephone and laptop computer are all of conventional construction and operation.

The subscriber viewing station, which is preferably located at a fixed location such as a residence but which may also be a mobile system which also includes a cellular telephone transceiver, also includes a CPU that is coupled with a monitor and with a modem. The modem is connectable with an internet service provider via a telephone cable line and cellular telephone. The subscriber station also may include a video recorder coupled with the CPU to record received images at the subscriber viewing station.

To initiate monitoring a subscriber or user connects with an internet service provider (ISP) through the subscriber's viewing station CPU and modem. The subscriber then accesses the monitoring service's global network address, i.e. its web page, using its assigned address. The monitoring service provides an identification page to the subscriber requesting the input of a previously established user's name and password. With correct entry and receipt of the user's name and password, the monitoring service transmits a call or ring signal which is received by the mobile station cellular telephone. Upon receipt of the call signal the cell phone wireless transceiver automatically establishes communications with the monitoring service. The mobile communications device thereupon commences to transmit real time video image data taken by the video camera through the modem to the monitoring service. The transmission is provided over a wireless link with a cell site in a conventional manner associated with CCITT protocol, including conventional periodic continue sending commands being transmitted from the cell site to the remote cellular telephone.

The cell site is interfaced with a telephone network which allows the monitoring service to receive the data. The monitoring service decrypts and unpackages the data. The data is retransmitted to the internet service provider which in turn relays it to the subscriber viewing station modem. The received data is translated by conventional video replay software within the CPU rendering the data viewable by the subscriber on the video monitor. The translated data may also be inputted to the viewing station video recorder for storage. Preferably the transmission is such that the data packets are sized to provide a real time, stream quality, video reproduction. Alternatively, the monitoring service may have its own internet servicing in which case it is intranet accessible rather than internet accessible. In that case the ISP is bypassed.

The just described system permits a parent at home to monitor the operation of a vehicle operated by his or her adolescent driver at anytime it chooses. The monitoring may be done without the young driver realizing when monitoring is actually occurring. This prevents him or her from modifying his or her driving behavior briefly during the monitoring period. This, in turn, provides an inducement for the young driver to operate the vehicle in a safe manner at all times.

The video recording capabilities of the system allow the parent to review and to display recorded images to the youth at a later time to show improper use of the vehicle observed by the parent. The video recording device within the vehicle itself may also be used to view vehicle operation at a time when the parent was not monitoring the vehicle operation in real time, i.e. when the parent was not in contact with the web site for real time monitoring. The video system capabilities also include timed functions wherein the recorder can be activated for a specified future time period.

It should be understood that the system may utilize multiple video cameras so as to provide different views of the surrounding environment, or may utilize a rotating camera that can be remotely rotated for different visions. The system may also include global positioning system (GPS) navigation equipment to provide and transmit exact locations of the vehicle to the viewing station.

Whereas the primary use of the system is designed for low cost family use, it may be utilized in other manners. For example, it may be used for monitoring the operation of rental cars, business cars and police cars. For such larger organizational use, the organization may have its own major computer and communication system. Thus although the invention has been shown and described in its preferred form, it should be understood that many modifications, additions and deletions may be made thereto without departure from the spirit and scope of the invention as set forth in the following claims.

What is claimed is:

1. A method of monitoring from a home base computer the operation of a vehicle having an on-board video camera having a data line linked with an on-board radio transceiver which comprises the steps of establishing communication between the home base computer and a monitoring service computer on a global network system, communicating an initial signal to the monitoring service which relays a transmit signal to the on-board transceiver, transmitting video data from the on-board radio transceiver to the home base computer for viewing with a monitor connected thereto, communicating a terminate signal from the home base computer to the monitoring service which radio relays a terminate transmission signal to the on-board transceiver, and disestablishing communication between the home base computer and monitoring service computer.

2. The method of claim 1 wherein communication is established and disestablished between the home base computer and monitoring service computer via an internet service provider.

3. The method of claim 1 further comprising the step of recording video data photographs by the on-board camera onto an on-board record medium.

4. The method of claim 1 further comprising the step of recording the transmitted video data onto home based record medium.

5. The method-of claim 1 wherein communications between the on-board radio transceiver and monitoring services are made via a cellular telephone network.

6. A system for monitoring operations of a vehicle from a home base comprising, in combination, a home based computer and monitor, a service monitor computer linkable with said home based computer via a global network system and also linked with a radio transceiver, and a video camera mounted in the vehicle having a video data line connected with an on-board CPU, modem and radio transceiver whereby a home based person may go on line with the service monitor and have the service monitor initiate transmission of video data from the vehicle to enable the home based person to view such via the internet.

7. The monitoring system of claim 6 wherein said radio transceiver is a cellular telephone.

8. The monitoring system of claim 6 wherein said home based computer is linked with said service monitor computer via an internet service provider computer.

9. The monitoring system of claim 6 further comprising an on-board VCR coupled with said on-board CPU.

10. The monitoring system of claim 6 further comprising a home based VCR coupled with said home based computer.

\* \* \* \* \*